United States Patent
Eggers et al.

(10) Patent No.: US 7,408,478 B2
(45) Date of Patent: Aug. 5, 2008

(54) AREA OF REPRESENTATION IN AN AUTOMOTIVE NIGHT VISION SYSTEM

(75) Inventors: Helmuth Eggers, Ulm (DE); Gerhard Kurz, Wendlingen (DE); Juergen Seekircher, Ostfildern (DE); Thomas Wohlgemuth, Aichtal (DE)

(73) Assignee: Daimler AG, Stuttgart (DE)

( * ) Notice: Subject to any disclaimer, the term of this patent is extended or adjusted under 35 U.S.C. 154(b) by 204 days.

(21) Appl. No.: 10/539,839

(22) PCT Filed: Dec. 4, 2003

(86) PCT No.: PCT/EP03/13688

§ 371 (c)(1),
(2), (4) Date: Nov. 28, 2005

(87) PCT Pub. No.: WO2004/059978

PCT Pub. Date: Jul. 15, 2004

(65) Prior Publication Data

US 2006/0152384 A1 Jul. 13, 2006

(30) Foreign Application Priority Data

Dec. 20, 2002 (DE) .............................. 102 59 882

(51) Int. Cl.
- *G08G 1/00* (2006.01)
- *B60Q 1/00* (2006.01)
- *H04N 7/18* (2006.01)
- *B60Q 1/02* (2006.01)

(52) U.S. Cl. ............... 340/901; 340/903; 340/425.5; 340/436; 348/135; 348/148; 315/82

(58) Field of Classification Search ............ 340/901; 348/148
See application file for complete search history.

(56) References Cited

U.S. PATENT DOCUMENTS

| | | | |
|---|---|---|---|
| 5,001,558 A * | 3/1991 | Burley et al. ............... 348/164 |
| 5,414,439 A | 5/1995 | Groves et al. |
| 6,150,930 A | 11/2000 | Cooper |
| 6,535,242 B1 * | 3/2003 | Strumolo et al. ............ 348/148 |
| 6,803,574 B2 * | 10/2004 | Abel et al. .................. 250/330 |
| 2002/0075387 A1 * | 6/2002 | Janssen ...................... 348/148 |

FOREIGN PATENT DOCUMENTS

| | | |
|---|---|---|
| DE | 40 32 927 A1 | 4/1992 |
| DE | 101 04 734 A1 | 8/2002 |
| DE | 101 26 492 A1 | 12/2002 |

\* cited by examiner

*Primary Examiner*—Donnie L Crosland
(74) *Attorney, Agent, or Firm*—Patent Central LLC; Stephan A. Pendorf

(57) ABSTRACT

A method for detecting surroundings by an automotive night vision system comprising several areas, including a detection area (3) in which surroundings related data is detected, an evaluation area within which the surroundings-related data detected by the night vision system is evaluated, and an area of representation in which information about the surroundings-related data detected therein is represented to the driver by an optical display unit. The area of representation is therefore restricted in the inventive method for detecting surroundings such that the area of representation comprises no more than the high beam area (2). The driver is shown only the surroundings related data which he/she would see anyway when actuating the conventional high beam due to the fact that the area of representation is restricted.

15 Claims, 2 Drawing Sheets

AREA OF REPRESENTATION IN AN AUTOMOTIVE NIGHT VISION SYSTEM

CROSS REFERENCE TO RELATED APPLICATIONS

This application is a national stage of PCT/EP2003/013688 filed Dec. 4, 2003 and based upon DE 102 59 882.7 filed Dec. 20, 2002 under the International Convention.

BACKGROUND OF THE INVENTION

1. Field of the Invention

The invention relates to a method for detecting surroundings by means of an automotive night vision system comprising a number of areas.

2. Related Art of the Invention

There are already first commercially available driver-assistance systems that improve the visibility for the driver in the event of poor weather or in the dark. These are night vision systems in which an infrared sensor is used to detect the vehicle surroundings ahead. The detected data relating to the surroundings are processed with the aid of a data processing unit to form an image, and are represented for the driver on an optical display in the vehicle. In which case, the driver looks at the optical display in order to pick up information and, if appropriate, can detect dangerous traffic situations.

IEEE Computer Graphics and Applications, September/October, 1999, page 6: "Night Vision: Infrared Takes to the Road" presents an automotive night vision system that comprises an infrared camera and a head-up display. In which case, the head-up display is used to project the data relating to the surroundings, which are detected by means of the infrared camera and are ahead of the vehicle, onto the windshield in a virtual fashion. In which case, the system lends the driver the possibility of a visual range that is three to five times greater than the visual range typical with a low beam. The result of this is that at a vehicle speed of 60 miles per hour the maximum reaction time on low beam of 3.5 seconds is raised to a reaction time of 17.5 seconds with night vision.

A system for assisting driver vision during night driving is presented on the Toyota Motor Corporation website (www-.toyota.co.jp/Showroom/Alltoyotalineup/LandCruiserCygnus/safety/index.html). In this case, a camera that is sensitive in the near infrared detects the surroundings and displays them to the driver on a head-up display. On low beam, the system indicates the course of the road, which is ahead of the vehicle light cone and is difficult to recognize, as well as persons, vehicles and obstacles located in the surroundings. To this end, the light cone of the low beam is adjoined by an area that can be recognized with the aid of the night vision system. The area that can be evaluated is ideally situated at approximately 100 m and reaches at most up to approximately 150 m. The system serves, in particular, as an assistant for long-range vision in situations where it is not possible to drive on high beam. When the driver is driving on high beam, the system provides him with information lying ahead by imaging objects which are difficult to recognize in direct view. Through the use of near infrared rays, the system can display the state of the road, objects that have fallen onto the road and other information relating to the road. The high beam light cone, which is specified with a range of approximately 180 m, is adjoined for this purpose by the area that can be detected with the aid of the night vision system. The area that can be detected is at approximately 200 m and is specified as approximately 250 m, at most. All previously commercially available night vision systems are designed in such a way that they can display objects as far removed as possible. However, they involve the high risk that in situations of poor visibility or in the darkness the driver will be led to drive faster than is possible without a night vision system.

SUMMARY OF THE INVENTION

It is therefore the object of the invention to provide a method for detecting surroundings by means of an automotive night vision system, with the aid of which information relating to the surroundings ahead is displayed to the driver without, in the process, leading to flying blind.

In accordance with the invention, a method is provided for detecting surroundings by means of an automotive night vision system. In order to detect data relating to the surroundings, the system comprises a number of areas. These include a detection area, wherein the night vision system is sensitive to optical radiation of invisible IR wavelengths, and data relating to the surroundings are detected. The system also comprises an area of representation, the data relating to the surroundings detected therein with the aid of the night vision system being represented for the driver on an optical display. In a way according to the invention, the area of representation of the night vision system in this case comprises at most the light cone of the vehicle high beam area. Because of the restriction of the area of representation, the display shows the driver only those data relating to the surroundings that he would see in any case on activation of the conventional high beam.

In a particularly advantageous way, the system comprises an evaluation area within which the data relating to the surroundings detected by means of the night vision system are subjected to evaluation, in particular object recognition.

In a further advantageous way, a tolerance area adjoins the area of representation of the night vision system. In which case, those data relating to the surroundings which covers the tolerance area are likewise represented for the driver by means of the optical display. In one embodiment of the invention, it is provided that the tolerance area is permanently prescribed. In which case, a tolerance area is advantageous, on the one hand, because no sharp separating line exists between the high beam area and the detection area. On the other hand, the boundary of the high beam area cannot be fixed with sufficient accuracy, because of the angular ranges of the camera, each pixel corresponding to a spatial direction. However, it is also conceivable to control the tolerance area automatically on the basis of further vehicle variables or variables of the surroundings, for example the driving speed. In a particularly preferred embodiment of the invention, the tolerance area is, however, set as a function of the evaluation of the data relating to the surroundings. For example, the tolerance area is automatically expanded whenever an object is situated only partially in the current area of representation. The tolerance area is expanded in this case in such a way that an object is covered completely by the area of representation and the tolerance area.

In the driving direction of the vehicle, the area of representation comprises at least a part of the low beam area. In which case, it is preferred not to represent objects in the area directly in front of the vehicle, since the driver can see these objects even without a night vision system. The area of representation is not necessarily laterally bounded in this case. In which case the opening angle of the night vision system is preferably selected in such a way that it does not penetrate the lobe of the high beam area at the side.

The evaluation area of the night vision system is advantageously designed in such a way that it comprises at least the high beam area of the vehicle. For the purpose of evaluation, the data relating to the surroundings detected in the evaluation area are then subjected to object recognition by means of a data processing unit in conjunction with methods for image processing and classification. If the objects recognized are located only partially in the evaluation area, the evaluation area is automatically expanded in an advantageous way. For this purpose, it is possible to establish, for example, whether a closed object contour is present. The evaluation area is expanded in this case until an object has been completely evaluated. In a particularly advantageous way, however, the evaluation area is designed such that it comprises the entire detection area of the night vision system, it thereby being possible also to detect objects located at a long distance. It is also conceivable in a profitable way not to recognize those objects that are located directly in front of the vehicle, in order to save computing time in the evaluation.

In a profitable embodiment of the invention, the objects detected by means of the evaluation in the area of representation are emphasized in the representation. It is preferable for this purpose to color the objects. In which case it is advantageous to subject the detected objects in advance to a classification and subsequently to color them differently with the aid of their class membership (for example, pedestrians, vehicles, . . . ). It would also be conceivable to represent only the object contour and color this in correspondingly.

In a further profitable embodiment of the invention, the information relating to the objects detected during the evaluation in the evaluation area is made available to internal vehicle systems for further evaluation. The information can serve the purpose in this case, for example, of activating safety-relevant systems at an early stage, or preparing them to be activated.

Further features and advantages of the invention emerge from the following descriptions of exemplary embodiments with the aid of the figures. In which case the figures do not show all the possible variants of the invention, further variants advantageously resulting, in particular, from combination.

DETAILED DESCRIPTION OF THE INVENTION

Figure 1:
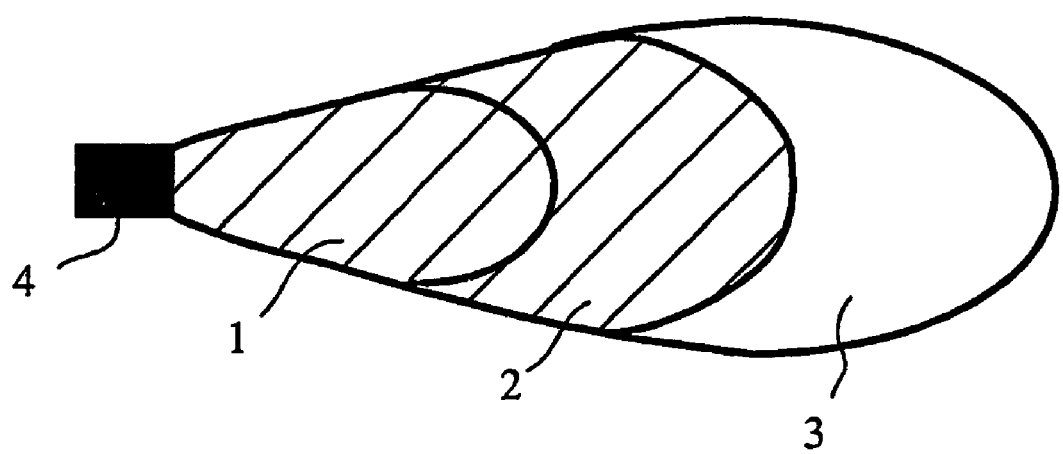
FIG. 1 shows the area of representation of the night vision system, which completely comprises the low beam and high beam areas.

The area of representation of the automotive night vision system (4) according to the invention is illustrated by way of example in FIG. 1. Here, the area of representation (illustrated in a singly hatched fashion) comprises the low beam area (1) and the high beam area (2) completely. In which case the area of representation extends in the driving direction up to the boundary between the high beam area (2) and the detection area (3).

Figure 2:
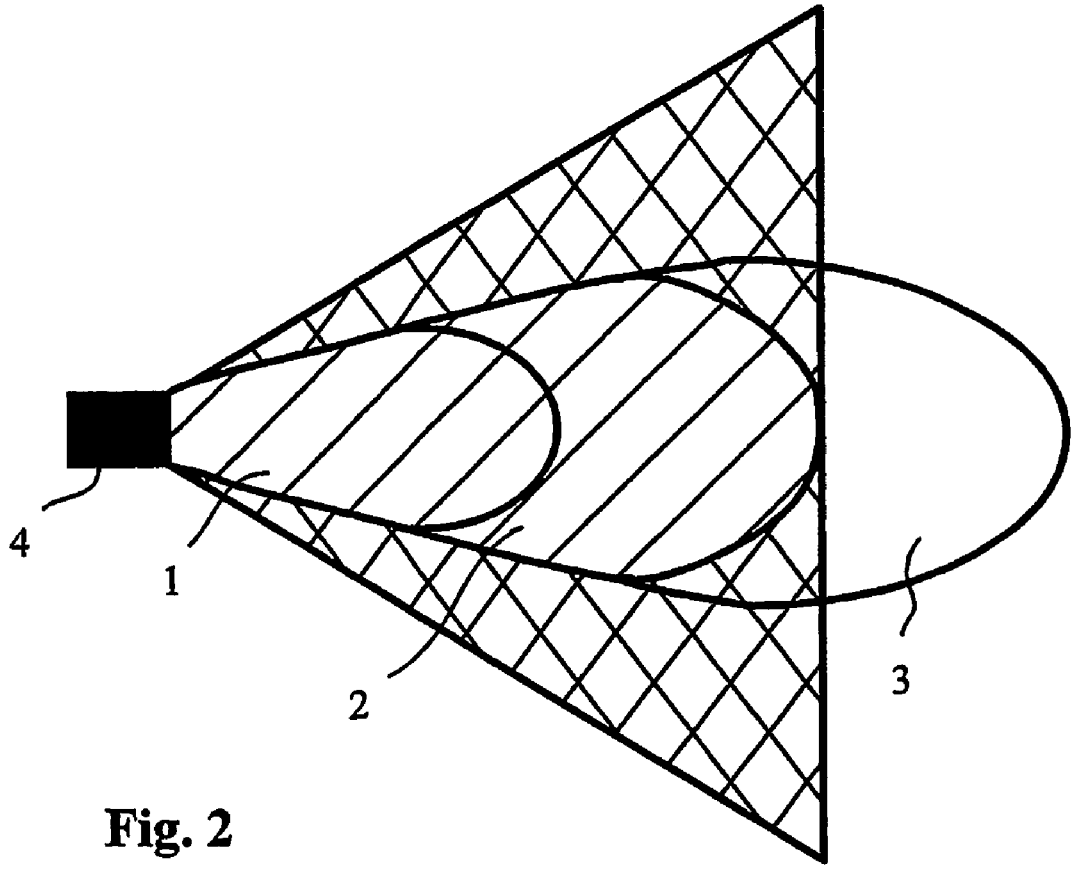
FIG. 2 shows the area of representation of the night vision system, which comprises the high beam area and a lateral tolerance areas.

FIG. 2 shows the area of representation of the automotive night vision system (4), there being no lateral limitation of the high beam area (2), in this case by comparison with the area of representation shown in FIG. 1. The opening angle of the camera is selected in such a way that tolerance areas (illustrated in a doubly hatched fashion) adjoin the high beam area (2) at the side.

Figure 3:
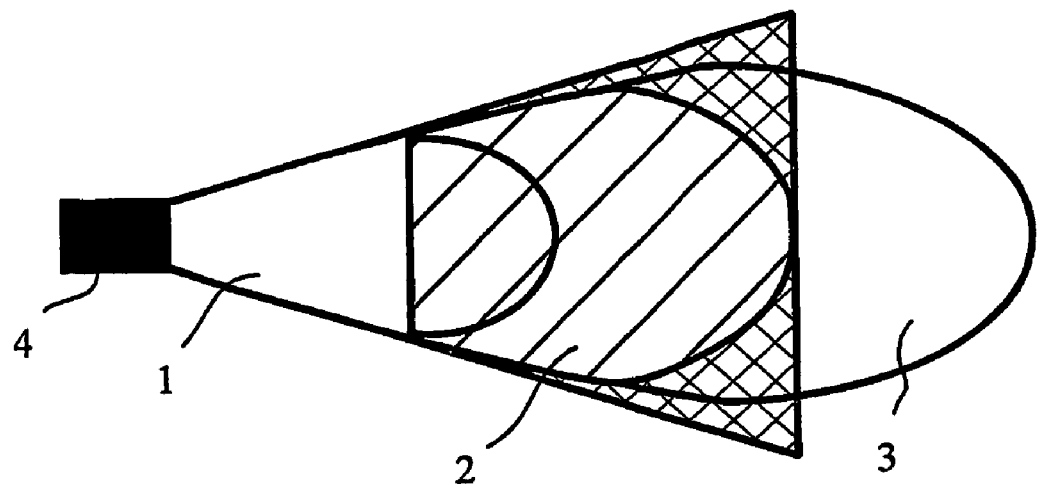
FIG. 3 shows the area of representation of the night vision system which partially comprises the low beam and high beam areas.

The night vision system (4) is designed in FIG. 3 in such a way that the area of representation differs by comparison with the area of representation shown in FIG. 1 in that the area of representation in FIG. 3 preferably comprises only a part of the low beam area (1). In addition, here, the tolerance area is limited at the side, the opening angle of the night vision system (4) being selected in such a way that it does not penetrate the lobe of the high beam area.

Figure 4:
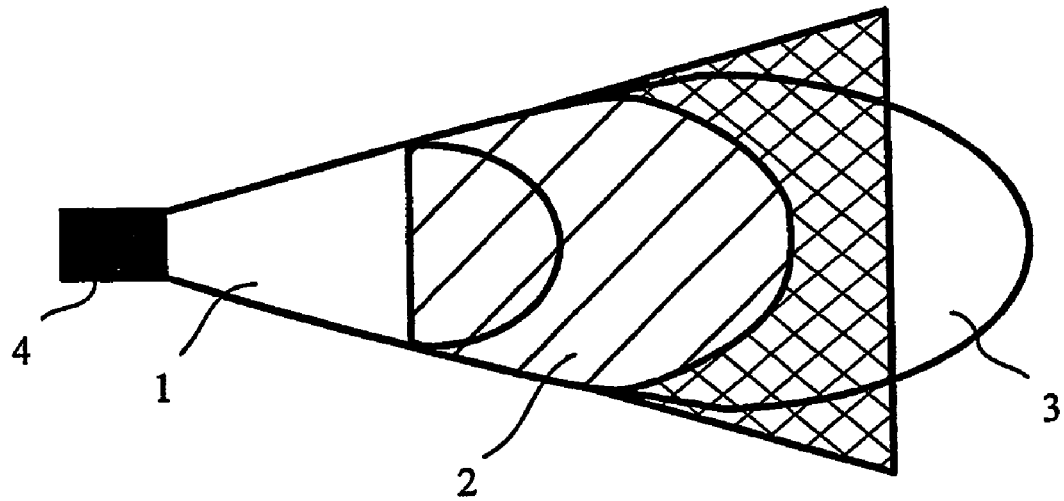
FIG. 4 shows the area of representation of the night vision system, which comprises the high beam area and an additional tolerance area in the driving direction.

FIG. 4 shows by way of example a further variant of the area of representation, the latter having a larger tolerance area by comparison with the area of representation specified in FIG. 3. The area of representation therefore does not end at the boundary between the high beam area (2) and the detection area (3) but extends further in the driving direction into the detection area (3).

The invention claimed is:

1. A method for detecting surroundings by means of an automotive night vision system of a vehicle having a high beam headlight illuminating a high beam area and a low beam headlight illuminating a low beam area, the method comprising:
   providing a detection area in which the night vision system is sensitive at least to optical radiation in the IR wavelength region and detects data relating to the surroundings,
   providing an area of representation that does not cover the entire detection area, wherein the area of representation is restricted to comprise at most the high beam area of the vehicle, and
   displaying to a driver of the vehicle only information from data relating to the surroundings detected by the night vision system in the area of representation.

2. The method as claimed in claim 1, further comprising:
   providing an evaluation area within which the data relating to the surroundings detected by means of the night vision system are subjected to evaluation.

3. The method as claimed in claim 1, further comprising:
   providing the area of representation with a tolerance area.

4. The method as claimed in claim 1, wherein the area of representation comprises at least a part of the low beam area.

5. The method as claimed in claim 2, wherein the evaluation area comprises at least the high beam area.

6. The method as claimed in claim 2, wherein objects detected by means of the evaluation in the area of representation are emphasized in the optical representation.

7. The method as claimed in claim 6, wherein the information relating to the objects detected during the evaluation in the evaluation area is made available to internal vehicle systems for further evaluation.

8. The method as in claim 2, wherein said evaluation is object recognition.

9. The method as in claim 8, wherein the evaluation area is automatically expanded when an object recognized is located only partially in the evaluation area until the object has been completely evaluated.

10. The method as in claim 2, wherein the evaluation area includes the entire detection area of the night vision system.

11. The method as in claim 8, wherein objects located directly in front of the vehicle are not recognized.

12. The method as in claim 3, wherein the tolerance area is permanently prescribed.

13. The method as in claim 3, wherein the tolerance area is automatically controlled on the basis of vehicle variables or variables of the surroundings.

14. The method as in claim 10, wherein the tolerance area is set as a function of an evaluation of data relating to the surroundings.

15. The method as in claim 11, wherein the tolerance area is automatically expanded whenever an object is situated only partially in the current area of representation in such a way that the object is covered completely by the expanded area of representation.

* * * * *